July 25, 1967     H. F. ARMSTRONG     3,332,130

CUTTING TOOL

Filed Oct. 5, 1966

INVENTOR.
Harold F. Armstrong
BY
Roberts, Cushman & Grover
ATT'YS

3,332,130
CUTTING TOOL

Harold F. Armstrong, Milford, N.H., assignor to The O.K. Tool Company, Inc., Milford, N.H., a corporation of New Hampshire
Filed Oct. 5, 1966, Ser. No. 584,559
6 Claims. (Cl. 29—105)

This invention relates to metal cutting tools such as milling cutters and particularly to rotary tools having bit recesses distributed therearound with bit holders for mounting bits in the recesses.

Objects of the invention are to provide bit holders which are simple and economical to produce, which can be adjusted quickly and easily, which lock the bits firmly in place, and which are durable and reliable in use.

According to this invention the tool comprises a carrier rotatable in a forward direction about an axis and having a bit recess opening on a face of the carrier, said recess including a rear wall facing in said forward direction and a front wall facing in the opposite direction, said front wall having a tapped bore entering the recess opposite said rear wall, a screw in said bore, a bit locator engaging said rear wall including means receiving and positively locating a bit on the locator, and a clamp between the screw and said locator for holding the bit against said locator. Preferably the aforesaid locator has a seat conforming to at least one side of the bit, the seat comprises a socket with peripheral walls and one side wall, said clamp forms an opposed side wall of the socket and has a suface opposed and inclined to said screw thereby to urge the locator against said recess wall, said locator carries adjustable means for selectively spacing the locator from said recess wall, said recess has a second wall facing the aforesaid carrier face, and said locator carrier second adjustable means for selectively spacing the locator from said second wall.

Figure 1:
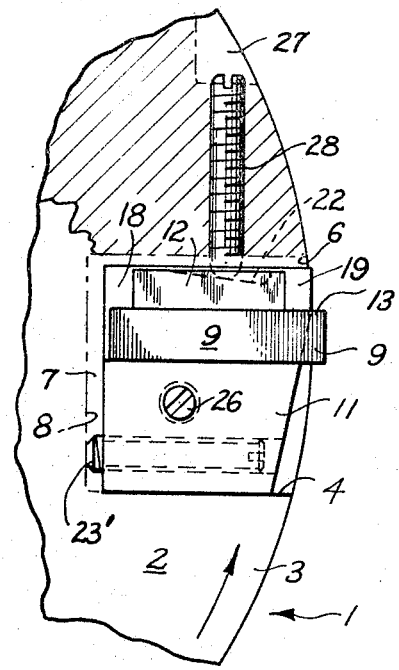
Figure 2:
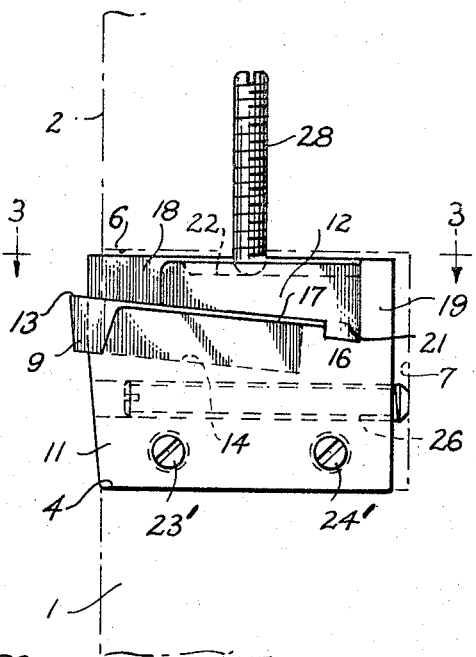
Figure 8:
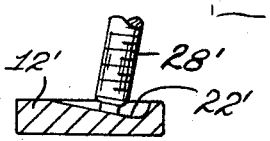
Figure 3:
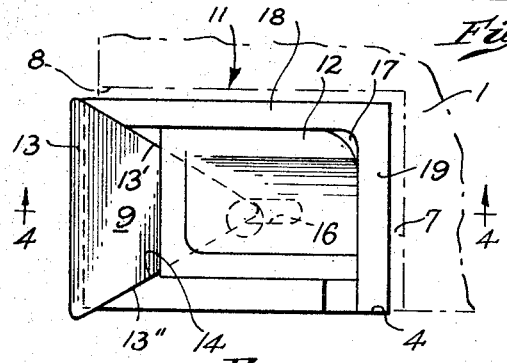
Figure 4:
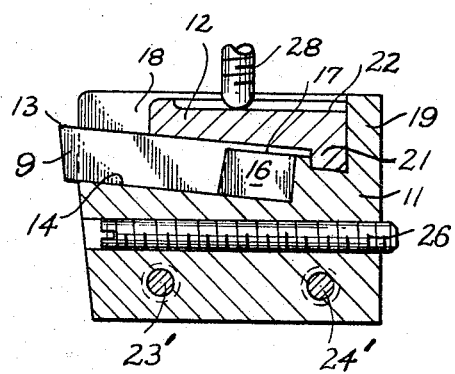
Figure 6:
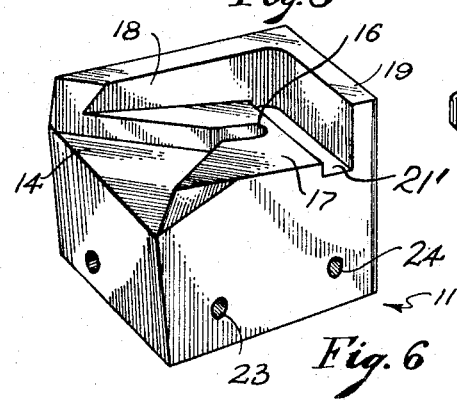
Figure 7:
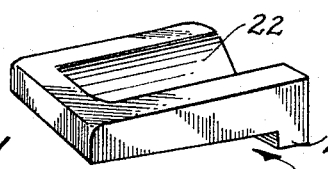
Figure 5:
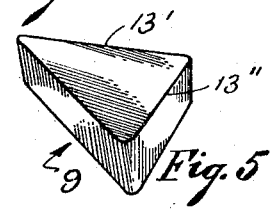

For the purpose of illustration a typical embodiment is shown in the accompanying drawings in which FIG. 1 is an end view of a rotary tool;
FIG. 2 is a peripheral view of the tool;
FIG. 3 is a section on line 3—3 of FIG. 2;
FIG. 4 is a section on line 4—4 of FIG. 3;
FIGS. 5 to 7 are isometric views respectively of a cutting bit, bit locator and camp for the tool; and
FIG. 8 is a view like FIG. 1 showing a modification.

The particular embodiment of the invention chosen for the purpose of illustration comprises a rotary carrier 1 having peripheral recesses which open through both its end face 2 and its peripheral face 3, each recess having a rear face or wall 4 facing in the direction of rotation, a front face 6 facing in the opposite direction, a bottom 7 facing the end opening of the recess, and a bottom 8 facing the peripheral opening of the recess. In each recess is a bit 9 and a cartridge for holding the bit, the cartridge comprising a bit locator 11 and a clamp or wedge 12. As shown the bit is triangular with three cutting edges 13, 13′ and 13″ for use successively, but it may have any desired shape such as square with four cutting edges. The locator 11 has a recess seat 14 for the bit with an extension 16 at its inner end to accommodate the inner corner of the bit. As shown in FIGS. 2 and 4 the seat 14 and upper face 17 of the locator preferably incline inwardly toward the rear face 4. The locator also has a front wall 18 and an inner wall 19 extending above the upper face 17 on the front and inner sides of the clamp 12. At its inner end the clamp 12 has a foot 21 seating in a groove 21′ in the upper surface 17 of the locator and the forward surface of the clamp has a recess 22 which inclines away from the front 6 of the recess outwardly toward the peripheral opening of the recess (FIG. 1). The groove 21′ serves to keep the clamp from sliding out when the bit has negative rake clearance.

Extending through tapped holes 23 and 24 in the locator and seating on the bottom 8 are two screws 23′ and 24′ for adjusting the extent to which the bit projects beyond the peripheral face 3 of the carrier. A screw 26 extends through the locator and seats on the bottom 7 to adjust the extent to which the bit projects beyond the end face 2 of the carrier. Threading through the carrier from a recess 27 is a screw 28 which seats on the inclined surface 22 of the wedge to clamp the bit and locator in place. By virtue of the inclination of the clamp surface 22 the screw 28 not only clamps the bit against the locator and the locator against the back 4 of the bit recess but, by cam action, also holds the screws 23′ and 24′ against the bottom 8. As shown in FIGS. 2 and 4 the thickness of the bit 9 exceeds the depth of the locator recess 14 by an amount equal to the height of the wedge foot 21 so that the wedge seats flatwise against both the bit and the upper surface 17 of the locator.

To install a bit it is assembled with a locator and clamp to form a cartridge which is inserted in a recess in the carrier, the screws 23′, 24′ and 26 are adjusted to cause the bit to project the desired distances beyond the periphery and end face of the carrier and the screw 28 is then tightened to lock the cartridge in position.

The modification in FIG. 8 differs from the foregoing in that the screw 28′ is tipped so as to seat on the surface 22′ of clamp 12′ at right angles.

It should be understood that the present disclosure is for the purpose of illustration only and that this invention includes all modifications and equivalents which fall within the scope of the appended claims.

I claim:

1. A cutting tool comprising a carrier rotatable in a forward direction about an axis and having a bit recess opening on a face of the carrier, said recess including a rear wall facing in said forward direction and a front wall facing in the opposite direction and a bottom wall, said front wall having a tapped bore entering the recess opposite said rear wall, a screw in said bore, a bit locator engaging said rear wall including means receiving and positively locating a bit on the locator, and a clamp between the screw and said locator for holding the bit against said locator, the clamp interlocking with the locator to form a cartridge and hold the bit in the recess.

2. A tool according to claim 1 wherein said locator has a seat conforming to at least one side of the bit, said seat inclining inwardly toward said rear wall.

3. A tool according to claim 2 wherein said seat comprises a socket with peripheral walls and one side wall, and said clamp forms an opposed side wall of the socket.

4. A tool according to claim 1 wherein said clamp has a surface opposed and inclined to said screw thereby to urge the locator against said bottom wall.

5. A tool according to claim 1 wherein said locator carries adjustable means for selectively spacing the locator from said bottom wall.

6. A tool according to claim 5 wherein said recess has a second wall facing the aforesaid carrier face, and said locator carries second adjustable means for selectively spacing the locator from said second wall.

(References on following page)

References Cited

UNITED STATES PATENTS

| | | | |
|---|---|---|---|
| 2,900,704 | 8/1959 | Sweet | 29—97 |
| 2,900,705 | 8/1959 | Walker | 29—96 |
| 3,101,020 | 8/1963 | Ditto | 29—96 X |

FOREIGN PATENTS

| | | |
|---|---|---|
| 556,117 | 8/1932 | Germany. |
| 896,902 | 11/1953 | Germany. |

HARRISON L. HINSON, *Primary Examiner.*